United States Patent [19]

Dal Palu'

[11] 4,360,942
[45] Nov. 30, 1982

[54] WINDSHIELD WIPER BLADE

[75] Inventor: Attilio Dal Palu', Rivoli, Italy

[73] Assignee: Fister S.a.s. di Bosso Giacomo & C., Turin, Italy

[21] Appl. No.: 206,169

[22] Filed: Nov. 12, 1980

[30] Foreign Application Priority Data

Nov. 15, 1979 [IT] Italy ............................. 53740/79[U]

[51] Int. Cl.³ .............................. B60S 1/04; B60S 1/38
[52] U.S. Cl. .................................................. 15/250.42
[58] Field of Search ........................ 15/250.32–250.42

[56] References Cited

U.S. PATENT DOCUMENTS

| | | | |
|---|---|---|---|
| 2,727,270 | 12/1955 | Bosso | 15/250.42 |
| 3,037,233 | 6/1962 | Peras et al. | 15/250.36 X |
| 3,576,044 | 4/1971 | Besnard | 15/250.32 |
| 3,659,309 | 5/1972 | Besnard | 15/250.32 |
| 3,872,535 | 3/1975 | Arman | 15/250.42 |
| 3,942,212 | 3/1976 | Steger et al. | 15/250.32 X |
| 3,978,544 | 9/1976 | van den Berg et al. | 15/250.42 |
| 4,137,598 | 2/1979 | Sharp | 15/250.42 |

FOREIGN PATENT DOCUMENTS

| | | | |
|---|---|---|---|
| 2310243 | 12/1976 | France | 15/250.42 |
| 712603 | 7/1954 | United Kingdom | 15/250.8 |

Primary Examiner—Peter Feldman
Attorney, Agent, or Firm—Frost & Jacobs

[57] ABSTRACT

A windshield wiper construction having an armature comprising a main support element adapted to be an actuator arm, the main support element carrying a pair of rocker elements which mount a lodging element for a flexible wiper blade, the principal feature of the construction comprising the use of first coupling means for detachably connecting the rocker elements to the opposite ends of the main support element for rotational movement relative thereto, the first coupling means permitting the rocker elements to be disengaged only when they are rotated to a predetermined position relative to their normal position of use, and second coupling means for connecting the lodging element to each of the rocker arms for both limited axial and transverse movement of the lodging element relative to the rocker elements, the arrangement permitting limited rotational movement of the rocker arms relative to the main support element during normal use preventing their movement to a position in which they may be disengaged from the main support element.

2 Claims, 8 Drawing Figures

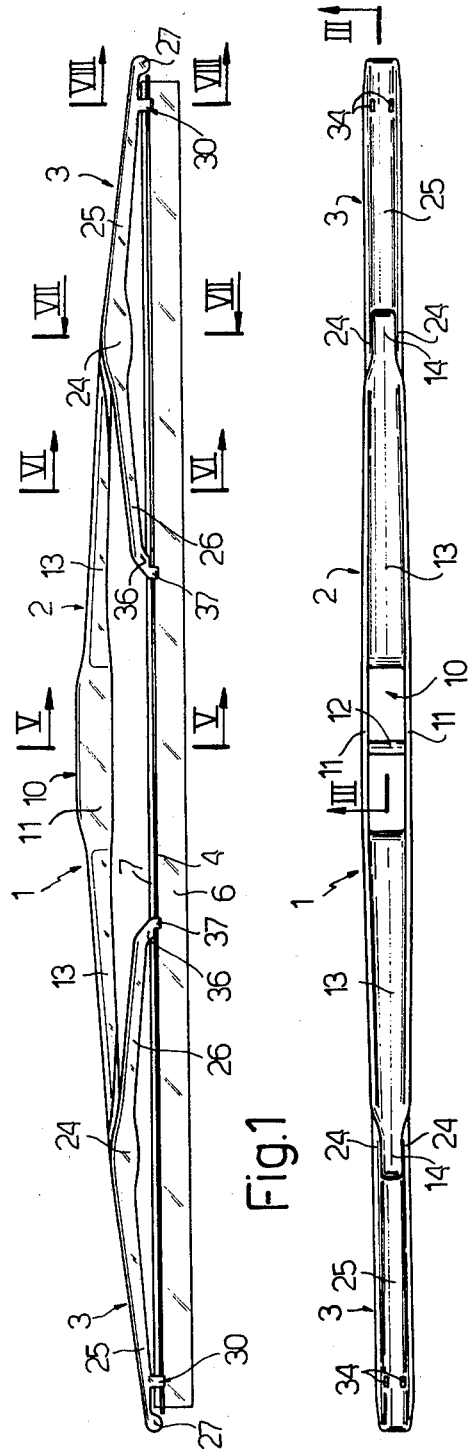
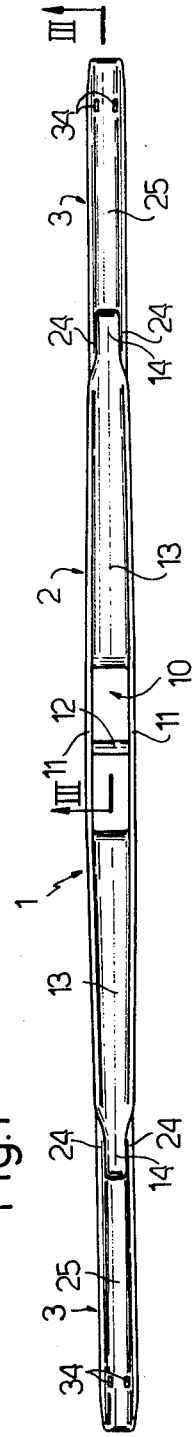
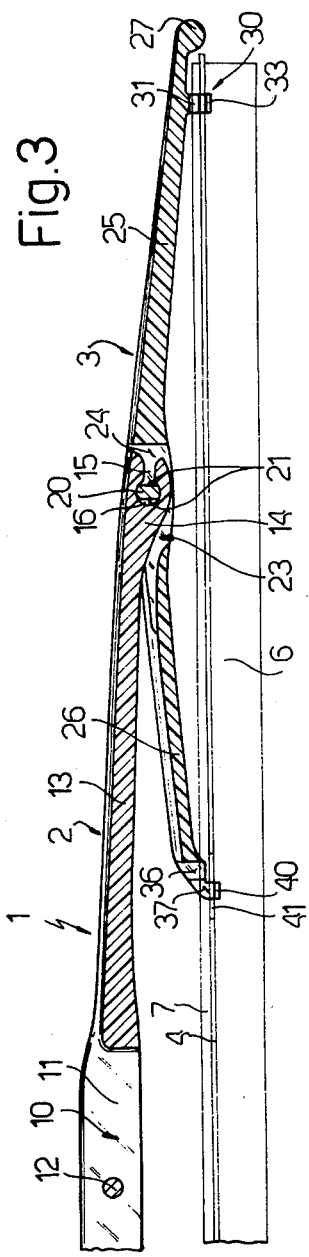
Fig.1
Fig.2
Fig.3

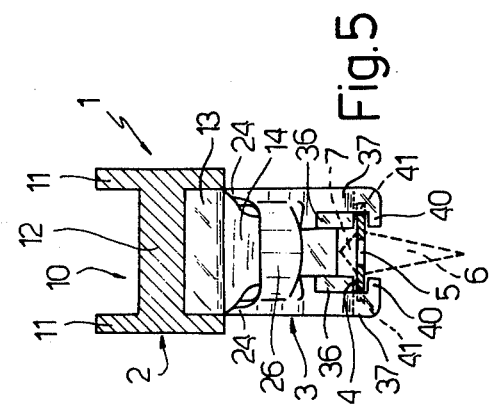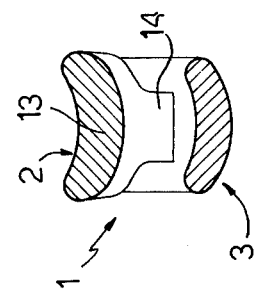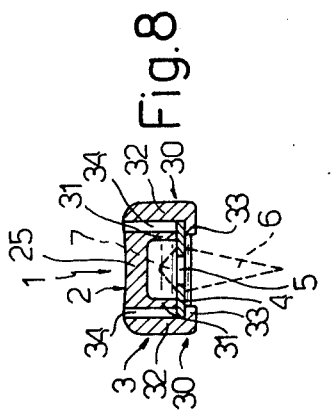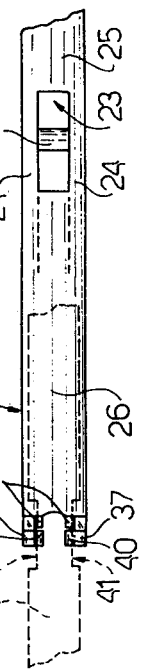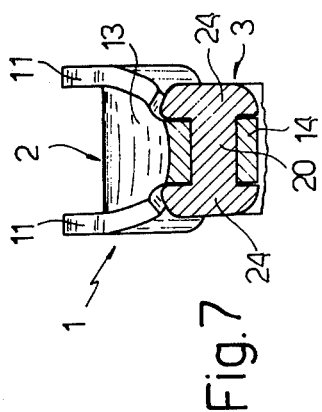

WINDSHIELD WIPER BLADE

BACKGROUND OF THE INVENTION

The present invention relates to a windshield wiper. As is known, these wiper blades are provided with an armature comprising, generally, an arc-shaped main support element adapted to be connected to an arm of an actuator device and supporting at least a rocker element which carries, directly or by means of other rocker elements, an element shaped like a rectangular lamina, having secured therein an upper relief of a wiper element made of rubber.

Usually, the various parts forming the said armature are made of metal, so that the coupling between the various elements, particularly between the main support element and the rocker element, is obtained by means of riveted small metal nails, or other equivalent systems, which however involve a relatively high cost of the equipment.

In order to reduce the manufacturing costs of the wiper blade, windshield wiper blades have been constructed in which the various parts of the armature are made of plastics, so that the coupling between the various parts, in particular the coupling between the rocker member and the main support element, may be obtained by means of pins, formed integrally with one of the elements, which engage in corresponding cavities formed in other element. However, in the manufacturing of these coupling systems some problems arise, inasmuch as the said elements of the armature must be sufficiently rigid to maintain a certain profile of the blade in order to insure a substantially uniform rest pressure of the wiper element on the glass, and at the same time such rigidity must not be excessive in order to allow limited deformability during the engagement of the pins in the respective cavities. Such problems are partly resolved by providing pins of reduced height, or lead-ins towards the respective cavities, or other similar solutions, which however often jeopardize the reliability of the coupling.

SUMMARY OF THE INVENTION

It is an object of the present invention to provide a windshield wiper blade in which the engagement between the various elements forming the armature, in particular between the main support element and the rocker element, is obtained with the aid of means of reduced cost which however insure in an absolute manner the reliability of the coupling, so as to avoid the above mentioned problems arising with the known windshield wiper blades.

According to the present invention there is provided a windshield wiper blade having an armature comprising a main support element adapted to be connected to an actuator arm and carrying at least a rocker element which carries, directly or by means of other rocker elements, a lodging element of a wiper element, characterized in that the said rocker element is supported by the said support element with the aid of coupling means which permit relative rotation between the said two elements, and a relative displacement between the said two elements only when the said elements are in a pre-established mutual position.

BRIEF DESCRIPTION OF THE DRAWINGS

For a better understanding of the present invention an embodiment thereof will now be described in detail, by way of non-limiting example, with reference to the accompanying drawings, in which:

FIGS. 1 and 2 are a side view and a top view, respectively, of the windshield wiper blade according to the invention, FIG. 3 is a sectional view along the line III—III showing the windshield wiper blade shown in FIG. 2, FIG. 4 is a partial view, from the bottom, of the windshield wiper blade shown in FIGS. 1 and 2, and FIGS. 5, 6, 7 and 8 are sectional views along lines V—V, VI—VI, VII—VII, VIII—VIII of the wiper blade shown in FIG. 1.

DETAILED DESCRIPTION OF THE INVENTION

Referring now to Figures from 1 to 3, the windshield wiper blade according to the present invention is provided with an armature 1 which comprises a main support element 2, at the two ends of which there are coupled, according to the characteristics of the present invention, two corresponding rocker elements 3 which carry, in the way which will be described later, an element 4 in the shape of a rectangular lamina and which is provided with a longitudinal slit 5 (seen in FIGS. 5 and 8) for accomodating a wiper element 6 which usually is made of rubber. The said wiper element 6 is connected, in a known manner, to the element 4 through the insertion of an upper portion 7 which is inserted beyond the longitudinal slit 5 and being larger in cross-section than the slit rests on the upper surface of the lamina-shaped element 4.

The main support element 2 is formed, in its central zone, with a through cavity 10 defined by two sidewalls 11 which are connected integrally by a transversal stake 12 for connection, in a known and not shown manner, to an actuator arm of the windshield wiper blade. At the ends of the cavity 10 the two sidewalls 11 merge into two arms 13 which define, as a whole, an arcuate profile for the main support element 2 which is concave in cross-section, as shown in FIG. 6. Towards their outer ends, the said two arms 13 are provided with a portion 14 having a smaller width and which develops towards the lower zone of the armature 1. The said portion 14 defines, at the end of the arm 13, a slit 15 which is open at the outer end of the arm 13, the inner end of the slit terminating in a cavity 16 having a circular cross-section and a diameter larger than the width of the slit 15. The cavity 16 is adapted to accomodate, in the way which will be described later, a stake 20 forming a part of the rocker element 3. The said stake 20 has a circular cross-section, whose diameter is slightly smaller than the diameter of the cavity 16, and is provided with two bevels defined by two diametrically opposed plane parallel walls 21 spaced apart by a distance which is slightly smaller than the width of the slit 15.

Each rocker element 3 is provided in its central portion, with a through cavity 23 defined by two sidewalls 24, the stake 20 extending integrally therebetween. At the ends of the said through cavity 23, the said two sidewalls 24 define two arms 25 and 26 which are inclined towards the lower zone of the armature 1, the arms having a transverse which is concave towards the upper portion of the armature 1. In particular, arm 25 has a profile such as to substantially follow the profile of the arm 13 of the main support element 2, when the rocker element 3 is disposed, relative to the support element 2, in such a way that the lamina-shaped element 4 is horizontal; arm 26 has, at least on its upper surface, the same dimensions as the curvature of the lower surface of arm 13 of the support element 2, in order to allow a mutual engagement between arms 26 and 13, when the rocker element 3 is rotated about the stake 20.

At its outer end the arm 25 has an edge 27 of substantially circular cross-section, which projects towards the lower zone of the armature 1, so as to provide protection for the end of the lamina-shaped element 4; therefore, the said arm 25 is provided, in the zone adjacent the end, with a pair of feet 30 having a first inner portion 31, turned vertically towards the lower zone of the armature 1, and a second outer portion 32 parallel to the portion 31 and having, at its lower part, an extension 33 turned towards the center of the armature 1. The distance between the inner ends, mutually turned towards one another, of the two extensions 33 of the two feet 30, is smaller than the width of the lamina-shaped element 4, so as to be able to support the latter (FIG. 8), and the distance between the lower surface of the parts 31 and the upper surface of the extensions 33 is substantially equal to the height of the said lamina-shaped element 4, so as to prevent the latter from substantially moving in a vertical direction. In the two pairs of feet 30 there are formed two holes 34 to facilitate the molding of the extensions 33.

The arms 26 are provided, towards their ends, with a first pair of feet 36 and second pair of feet 37 which are similar to the parts 31 and 32, respectively, of the pairs of feet 30. In fact, the pairs of feet 37 have, at the lower end, two extensions 40, turned mutually towards each other, and in which the distance between their inner ends is smaller than the width of the lamina-shaped element 4, while the distance between the lower surface of the feet 36 and the upper surface of the said extensions 40 is slightly larger than the thickness of the said lamina-shaped element 4. However, a particular difference consists in that the thickness of the said feet 37 is greater than the thickness of the parts 32 of the feet 30, and therefore the inner surfaces of the said feet 37 are closer to the diametral plane of the armature 1, than the inner surfaces of the said parts 32. The said feet 37 are therefore disposed in corresponding notches 41 formed in lateral zones of the lamina-shaped element 4 (FIGS. 3, 4 and 5); the length of these notches 41 is larger than the length of the said feet 37, so as to allow a relative sliding between the element 4 and the rocker element 3, as will be described later.

The coupling between the rocker element 3 and the main support element 2, in the windshield wiper blade of the present invention, is obtained in the following manner.

As can be seen in FIG. 3, when the rocker element 3 is in such a position that the lamina-shaped element 4 is substantially horizontal, the stake 20 is disposed with its greater dimension parallel to the width of the slit 15, so that the stake 20 oscillates in the cavity 16, but cannot come out from the slit 15, and thus the rocker element 3 may rotate relatively with respect to the main support element 2, without disengaging from the latter. The disengagement between the rocker element 3 and the support element 2 takes place only by rotation of the rocker element 3 by 90° about the stake 20, so that the plane parallel parts 21 coincide with the lower and upper surfaces of the slit 15. This relative position between the rocker element 3 and the support element 2, which does not occur in the conditions of utilization of the windshield wiper blade, is the only position which therefore allows the extraction of the rocker element 3 and which, previously, has allowed its engagement with the support element 2.

In order to prevent detachment of the rocker element 3 when the windshield wiper blade is not resting with the wiper element 6 on the surface of the windshield, as when it has to be cleaned, the said notches 41 in combination with the pairs of feet 37, form a limit to the relative sliding movement of the rocker element 3 and wiper element 4, which is up to a certain extent necessary for the utilization of the wiper blade, between the lamina-shaped accomodation element 4 and pairs of feet 37 of the rocker element 3. In this way the rotation of the rocker element 3 is limited up to such a value that the pairs of feet 37 rest on the edge of the notches 41, and even with a curved position of the lamina-shaped element 4 the position of disengagement of the rocker elements 3 is not attained. Such relative coupling between pairs of feet 37 of the rocker element 3 and the notches 41 of the lamina-shaped element 4 constitutes also an impedance to the extraction of the said lamina-shaped element 4 from the rocker elements 3.

With the windshield wiper blade of the present invention there is thus obtained the advantage of having a reliable engagement between the rocker elements 3 and the main support element 2, with the possibility of rotation of the rocker elements 3, without the risk of disengagement of the same, and with very simple coupling modalities, since such coupling takes place without any dangerous deformation of the parts, in only two determined positions (mutually rotated by 180°) of the rocker elements 3 with respect to the main support element 2.

The concave profile shape of the arms 13 of the main support element 2 and of the arms 25 and 26 of the rocker elements 3 also to confers to the windshield wiper blade particular aerodynamical characteristics.

Finally, it is clear that the embodiment described hereinabove of the windshield wiper blade according to the present invention is susceptible of modifications and variations without departing from the scope of the invention itself.

For example, coupled to the main support element 2 may be a single rocker element 3, at one of its ends, or the two rocker elements 3, instead of directly supporting the lodging element 4 of the wiper element 6, may suport additional rocker elements coupled in the same described manner, of coupling to the main support element 2, and provided, in like manner, with the pairs of feet for supporting the plane lamina-shaped element 4. The shape of the stake 20 also may be varied, having substantially in its cross-section, between the straight lines passing through the center, a maximum dimension slightly smaller than the diameter of the cavity 16, and a minimum dimension slightly smaller than the width of the slip 15.

All elements forming the armature 1 may conveniently be moulded of relatively rigid plastics or of any other suitable material.

I claim:

1. A windshield wiper construction having an armature made of relatively rigid plastic comprising a main support element adapted to be connected to an actuator arm, a pair of rocker elements, first coupling means for detachably connecting said rocker elements to the opposite ends of said main support element for rotational movement relative thereto, said rocker arms having a normal position of use in which said arms lie in generally parallel relation to said main support element and being detachable from said main support element when rotated through an angle of about 90°, an elongated lodging element mounting a flexible wiper blade, said first coupling means comprising a first body in the form of a stake having two parallel plane walls disposed perpendicularly with respect to the upper surface of said lodging element when in its normal position of use, and a second body having a slit therein terminating inwardly in a cavity of a size to receive said stake, said slit extending generally parallel to the upper surface of said lodging element when said lodging element is in its normal position of use, said slit being of a width to permit said stake to be passed therethrough when said stake is rotated to a position in which its two parallel plane walls parallel the opposite sides of said slit, the width of said slit being insufficient to permit the stake to pass therethrough when the parallel plane walls of said stake do not parallel the opposite sides of said slit, one of said bodies being connected to an end of said main support element and the other of said bodies being connected to the center portion of the rocker element, and second coupling means connecting said lodging element to each of said rocker arms for both limited axial and transverse movement of said lodging element relative to said rocker arms, said second coupling means, by reason of the limited movement of said lodging element relative thereto, permitting limited rotational movement of said rocker arms relative to said main support element but preventing rotational movement of the rocker arms to a position in which they may be detached from said main support element, whereby the wiper will not be accidentally disengaged from its actuator arm during normal use.

2. The windshield wiper construction claimed in claim 1 wherein said second coupling means comprises pairs of cavities on the opposite sides of said lodging elements, and corresponding pairs of feet on said rocker elements of a size to engage said lodging element in the areas of said pairs of cavities, said pairs of cavities having a length which is greater than the width of said pairs of feet, whereby said lodging element may be moved axially with respect to said pairs of feet within the confines of said cavities, said second coupling means also including short projections adjacent said feet, said pairs of feet and said projections defining a space therebetween in which said lodging element is received, the height of said space being greater than the thickness of said lodging element, whereby said lodging element is free for both limited axial and transverse movement relative to said rocker arms.

* * * * *

UNITED STATES PATENT AND TRADEMARK OFFICE
CERTIFICATE OF CORRECTION

PATENT NO. : 4,360,942
DATED : November 30, 1982
INVENTOR(S) : ATTILIO DAL PALU'

It is certified that error appears in the above-identified patent and that said Letters Patent are hereby corrected as shown below:

On the informational first page, the foreign application priority data should be:

-- November 15, 1979  Italy  53 746B/79 --.

Signed and Sealed this

Twenty-fourth Day of May 1983

[SEAL]

Attest:

DONALD J. QUIGG

Attesting Officer  Acting Commissioner of Patents and Trademarks